April 27, 1948.     J. W. HALL     2,440,633
SAW FILING TOOL
Filed June 18, 1946
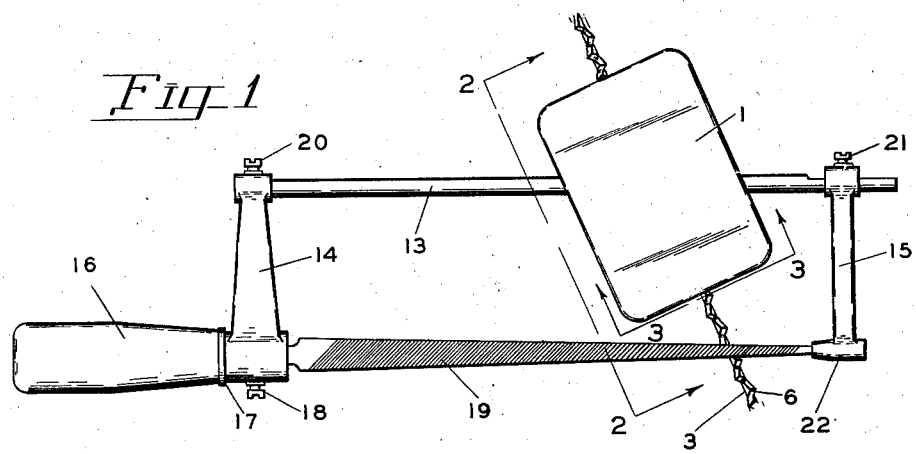
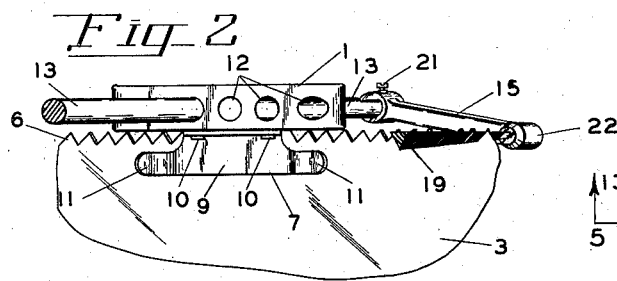
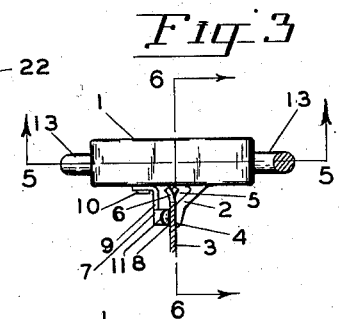
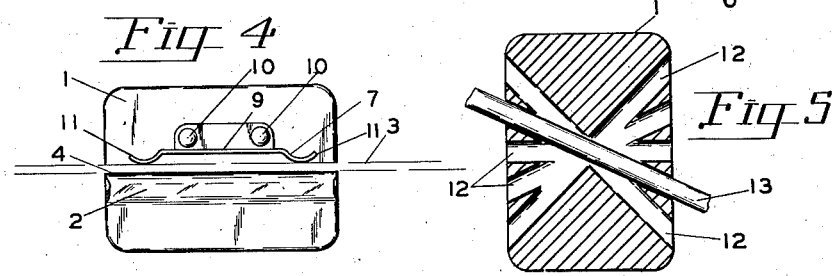
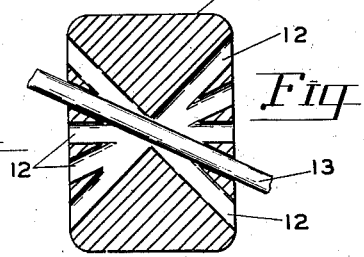
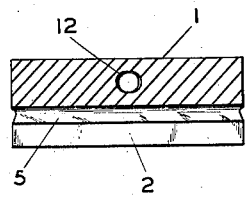
INVENTOR.
JOSEPH W. HALL
BY
*Kimmel & Crowell*
ATTORNEYS Patented Apr. 27, 1948

2,440,633

UNITED STATES PATENT OFFICE 2,440,633

SAW FILING TOOL

Joseph W. Hall, Portland, Oreg.

Application June 18, 1946, Serial No. 677,565

2 Claims. (Cl. 76—36)

This invention relates to saw filing tools and is particularly related to guides for controlling the angle of the file relative to the saw in the filing of the teeth.

The primary object of the invention is the provision of a guide block for engaging the sides of the saw adjacent the teeth, said guide block having guideways therethrough for directing the travel of a guide bar having a file mounted thereto.

These guideways are formed in the guide block at different angles to the saw on which the guide block is mounted. The guide bar, which is guided by the guides within the block forms part of the frame of the device for holding the file and when the different guides are selected means is provided for permitting the change over of the guide bar within the guide block.

These and other incidental objects will be apparent in the drawing, specifications and claims.

Referring to the drawings:

Figure 1 illustrates my new and improved saw filing tool mounted on a fragment of a saw.

Figure 2 is a fragmentary view of the tool and the saw taken on line 2—2 of Figure 1, looking in the direction indicated.

Figure 3 is a fragmentary section of the tool and saw taken on line 3—3 of Figure 1.

Figure 4 is an inverted view of the guide block.

Figure 5 is a plan sectional view taken of the guide block on line 5—5 of Figure 3, the same having been removed from the saw.

Figure 6 is a sectional view taken on line 6—6 of Figure 3.

In the drawings:

My new and improved saw filing tool consists of a guide block 1, which has a downwardly extending guide bar 2 which engages the side of the saw 3 at 4. This guide bar is cut away or recessed at 5 so that the teeth 6 of the saw may work freely therethrough.

Disposed oppositely to the guide bar 2 is a resilient guide 7 which contacts the opposite side of the saw 3 at 8. This guide consists of a body portion 9, which is secured to the guide block 1 by any suitable means, as rivets 10. On either end of the guide are extensions or fingers 11 which engage the side of the saw. These fingers are flexible so that they may bear snugly against the saw at all times, maintaining the block 1 at right angles to the saw and permitting its movement therealong.

Guideways 12 are formed within the body of the guide block 1 and receive a guide bar 13, which forms part of the frame of the file holder, which consists of the bar 13, the arms 14 and 15. The arm 14 is rotatably mounted upon the handle 16 at 17 and is held therein by a set screw 18. This construction permits the rotation of the handle and the file 19 relative to the teeth of the saw. The bar 13 is held at a fixed position relative to the arm 14 by the set screw 20 and has the arm 15 held at a fixed position at its opposite end by the set screw 21. The end of the file 19 is inserted within a socket 22 on the opposite end of the bar 15.

In the operation of my new and improved saw filing tool the guide bar block 1 is mounted to the saw 3 by springing back the fingers 11 of the guide unit 7 and placing the same over the teeth of the saw, as best illustrated in the drawings. The arm 15 of the guide file frame is removed from the guide bar 13 and the guide bar is inserted in the guideway 12 to provide for the filing of the teeth 6. The bar 15 is then replaced on the guide bar 13 and locked thereon by the set screw 21. The operation of filing can then be continued throughout the length of the saw for this particular angle required for a given set of teeth, after which the device may be dismounted again and another guideway selected for completing the filing operation.

I do not wish to be limited to the exact mechanical structure as illustrated and disclosed, as other mechanical equivalents may be substituted still coming within the scope of my claims.

Having thus described my invention, what I claim is:

1. Supporting means for a saw tooth file holder having a file and a guide bar parallel to said file, comprising a guide block, means resiliently supporting said block on the cutting edge of a saw, said block formed with a plurality of horizontally disposed angularly related bores therethrough through a selected one of which said guide bar is slidably engageable for slidably supporting said file in engagement with the teeth of said saw in selected angular relation thereto.

2. Supporting means for a saw tooth file holder having a file and a guide bar parallel to said file, comprising a guide block, means resiliently supporting said block on the cutting edge of a saw, said block formed with a plurality of intersecting horizontally disposed angularly related bores therethrough through a selected one of which said guide bar is slidably engageable for slidably supporting said file in engagement with the teeth of said saw in selected angular relation thereto.

JOSEPH W. HALL.

(References on following page)

REFERENCES CITED

The following references are of record in the file of this patent:

UNITED STATES PATENTS

| Number | Name | Date |
|---|---|---|
| 15,940 | Howlett | Oct. 21, 1856 |
| 23,655 | Beardsley | Apr. 19, 1859 |
| 95,871 | Bell | Oct. 19, 1869 |
| 139,149 | Henis | May 20, 1873 |
| 173,866 | Roth | Feb. 22, 1876 |
| 218,656 | Basom | Aug. 19, 1879 |
| 319,489 | Hill | June 9, 1885 |
| 493,445 | Page | Mar. 14, 1893 |
| 542,282 | Rood | July 9, 1895 |
| 599,327 | Foss | Feb. 22, 1898 |
| 1,223,191 | Merritt | Apr. 17, 1917 |
| 1,330,514 | Brooks | Feb. 10, 1920 |
| 1,562,306 | Decheff | Nov. 17, 1925 |
| 2,086,299 | Jonsson | July 6, 1937 |
| 2,421,657 | Speed | June 3, 1947 |